(12) United States Patent
Arlt

(10) Patent No.: US 7,665,747 B2
(45) Date of Patent: Feb. 23, 2010

(54) STEERING GEAR ASSEMBLY HAVING RACK BUSHING

(75) Inventor: George E. Arlt, Midland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 354 days.

(21) Appl. No.: 11/893,945

(22) Filed: Aug. 17, 2007

(65) Prior Publication Data

US 2008/0088104 A1    Apr. 17, 2008

Related U.S. Application Data

(60) Provisional application No. 60/851,414, filed on Oct. 13, 2006.

(51) Int. Cl.
*B62D 3/12* (2006.01)
*F16C 27/06* (2006.01)

(52) U.S. Cl. .................. 280/93.514; 280/93.515; 74/388 PS; 384/215; 384/296

(58) Field of Classification Search ............ 280/93.51, 280/93.513–93.515; 74/388 PS; 384/215, 384/220, 276, 295, 275, 296, 299, 291
See application file for complete search history.

(56) References Cited

U.S. PATENT DOCUMENTS

| | | | | |
|---|---|---|---|---|
| 2,608,451 | A | * | 8/1952 | Pierce, Jr. .................. 384/536 |
| 4,208,075 | A | * | 6/1980 | Templeton .................. 384/29 |
| 4,913,562 | A | * | 4/1990 | Rosen .................. 384/276 |
| 5,181,581 | A | | 1/1993 | Engler |
| 5,216,928 | A | | 6/1993 | Kodachi |
| 5,271,476 | A | | 12/1993 | Minamibata |
| 5,611,628 | A | * | 3/1997 | Brouwer .................. 384/220 |
| 5,709,283 | A | * | 1/1998 | Nief .................. 180/428 |
| 5,836,699 | A | * | 11/1998 | Back et al. .................. 384/276 |
| 5,857,318 | A | * | 1/1999 | Odai et al. .................. 59/4 |
| 5,895,051 | A | | 4/1999 | Bowers |
| 5,961,219 | A | * | 10/1999 | Maughan .................. 384/220 |
| 6,155,375 | A | | 12/2000 | Gierc et al. |
| 6,330,929 | B1 | * | 12/2001 | Gierc et al. .................. 180/428 |
| 6,435,050 | B1 | | 8/2002 | Tanke, II et al. |
| 6,454,044 | B1 | | 9/2002 | Menjak et al. |
| 6,467,566 | B1 | | 10/2002 | Harer et al. |

(Continued)

FOREIGN PATENT DOCUMENTS

JP    2003 322165    11/2003

(Continued)

*Primary Examiner*—Paul N Dickson
*Assistant Examiner*—Nicole Verley
(74) *Attorney, Agent, or Firm*—Cantor Colburn LLP

(57) ABSTRACT

A rack and pinion steering gear assembly including a housing, a rack that is translatably moveable relative to the housing along an axis and a bushing operably disposed between the rack and housing. The bushing defines a gap which extends the entire axial length of the bushing. At least one compressible member may be disposed between the bushing and the housing with the compressible member extending across the gap in the bushing and fully encircling the bushing. The bushing may also include a radial flange that acts as a travel stop. The bushing may also be formed of an acetal material wherein the flange and a tubular portion of the bushing are axially separated by an intermediate portion having a relatively thin radial thickness. Axially extending recesses may be provided to enhance the flexibility of the bushing.

18 Claims, 4 Drawing Sheets

U.S. PATENT DOCUMENTS

| | | | |
|---|---|---|---|
| 6,485,180 B2 * | 11/2002 | Mena | 384/222 |
| 6,637,540 B2 | 10/2003 | Kielar et al. | |
| 6,644,430 B2 * | 11/2003 | Harer et al. | 180/428 |
| 6,681,885 B2 | 1/2004 | Harer | |
| 7,056,027 B2 * | 6/2006 | Puckett | 384/276 |
| 7,220,056 B2 * | 5/2007 | Kubota et al. | 384/215 |
| 7,401,789 B2 * | 7/2008 | Harer et al. | 277/585 |
| 2002/0085778 A1 | 7/2002 | Mena | |
| 2006/0076180 A1 | 4/2006 | Saito et al. | |
| 2006/0219467 A1 | 10/2006 | Damore et al. | |
| 2006/0266140 A1 * | 11/2006 | Harer | 74/89.12 |
| 2007/0017732 A1 | 1/2007 | Harer et al. | |

FOREIGN PATENT DOCUMENTS

| | | |
|---|---|---|
| JP | 2004 132511 | 4/2004 |
| JP | 2004 183780 | 7/2004 |
| JP | 2004 210136 | 7/2004 |

* cited by examiner

STEERING GEAR ASSEMBLY HAVING RACK BUSHING

CROSS REFERENCE TO RELATED APPLICATIONS

This application claims priority under 35 U.S.C. 119(e) of U.S. provisional patent application Ser. No. 60/851,414 filed on Oct. 13, 2006 entitled RACK AND PINION STEERING GEAR ASSEMBLY HAVING C-SHAPED RACK BUSHING the disclosure of which is hereby incorporated herein by reference.

BACKGROUND OF THE INVENTION

1. Field of the Invention

The present invention relates to steering gear assemblies and, more particularly, to rack and pinion steering gear assemblies having at least one rack bushing.

2. Description of the Related Art

Conventional rack and pinion steering gear assemblies, whether manual or having an electric or hydraulic power assist, typically include a bushing that provides a low friction-sliding surface for rack translation along a Y-axis and rotation about its centerline while supporting the rack in the X and Z directions in a mutually perpendicular X-Y-Z coordinate system. Rack bushings are typically installed in the gear assembly housing bore opposite the pinion end and are often retained by a snap fit into a groove formed in the housing bore, by being press fitted into the bore, or, by the use of a separate snap ring retainer.

Many known rack bushing designs employ a generally cylindrical shape having a closed and continuous periphery. Oftentimes, such bushings are made of well-known self-lubricating materials, such as, for example, acetal. One example of such a known rack bushing is shown in FIGS. 1-6. The prior art steering gear assembly 10 of Figure includes a housing 12 in which a rack (not shown) is positioned. A rack bushing 14 is located within the internal bore of housing 12 and includes two sets of slots 16, 18 that extend longitudinally from opposite ends of bushing 14. The slots 16, 18 are provided to facilitate the radial expansion and contraction of bushing 14. A radially extending projection 15 is used to engage a recess located in the housing bore and secure bushing 14 within housing 12. Prior art bushing 14 is shown in several views in FIGS. 3-6. Such a bushing, however, does still tend to encounter hoop stresses which limit such radial expansions and contractions. Mena discloses another prior art rack bushing that has similar front and rear slots in U.S. Pat. No. 6,485,180 B2, the disclosure of which is expressly incorporated herein by reference.

In rack and pinion steering gears having a bushing with a closed periphery encircling the rack and located between the rack and the housing within the housing bore, clearances will generally be provided between the rack and the bushing and between the bushing and the housing to accommodate manufacturing tolerances and thermal expansion. Clearances between the bushing and rack or between the bushing and housing, however, can, in certain driving conditions, create objectionable rattle noise that can be heard by the driver and passengers. Such objectionable noise tends to grow louder as the bushing wears and the clearances increase and is the source of significant warranty issues. Those steering gears having a high inertia above the steering gear often suffer from such objectionable noises and non-assisted standard manual rack and pinion gears and column assist and single pinion assist electric power steering systems are particularly susceptible to such objectionable noises. Hydraulic gears are not as susceptible to such rattle noises as manual gears, but the concern with such objectionable noises may still be present in such applications.

SUMMARY OF THE INVENTION

The present invention provides a rack and pinion steering gear assembly having a well-performing bushing that can be inexpensively manufactured and easily installed.

The invention comprises, in one form thereof, a rack and pinion steering gear assembly that includes a housing, a rack disposed at least partially within the housing, the rack being translatably moveable relative to the housing along an axis and a bushing operably disposed between the rack and the housing. The bushing has an axial length and defines a gap which extends the entire axial length of the bushing. At least one compressible member is disposed between the bushing and the housing wherein the compressible member extends across the gap in the bushing and fully encircles the bushing.

The invention comprises, in another form thereof, a rack and pinion steering gear assembly that includes a housing, a rack disposed at least partially within the housing, the rack being translatably moveable relative to the housing along an axis and a bushing consisting essentially of an acetal material. The bushing is operably disposed between the rack and the housing and has an axial length and defines a gap. The gap extends the entire axial length of the bushing. The bushing has a substantially tubular portion and a flange portion which are axially separated by an intermediate portion. The flange portion includes a radially extending flange having first and second opposing surfaces. The first surface of the flange is bearingly engaged with a surface of the housing positioned at an angle to the axis. The intermediate portion separating the tubular portion and the flange portion has a radial thickness that is less than the radial thicknesses of the tubular portion and the flange portion. A radially inwardly facing surface of the bushing defines a first substantially cylindrical portion in the tubular portion that has a first diameter and a second substantially cylindrical portion in the flange portion that has a second diameter with the second diameter being larger than the first diameter whereby the inwardly facing surface in the flange portion is spaced from the rack.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
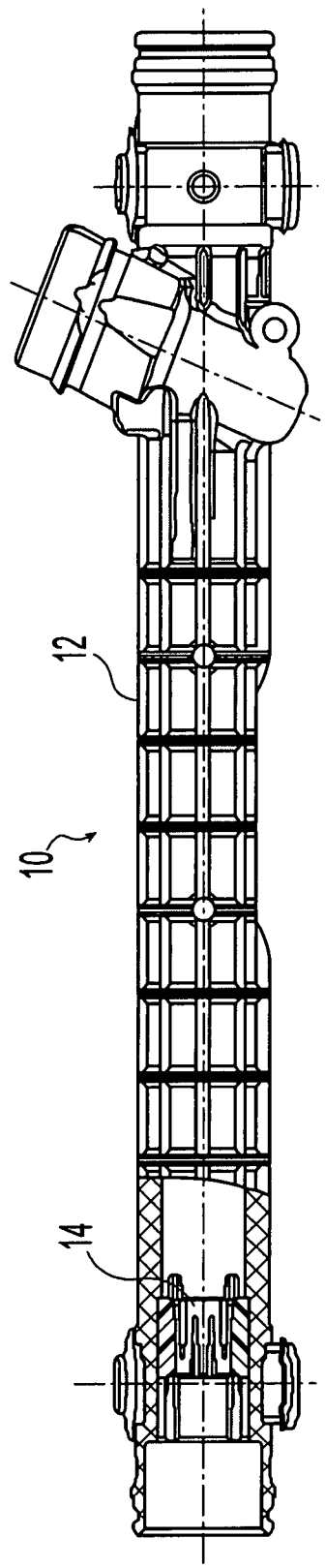
FIG. 1 is a partial cut-away view of a prior art rack and pinion steering gear assembly.
Figure 2:
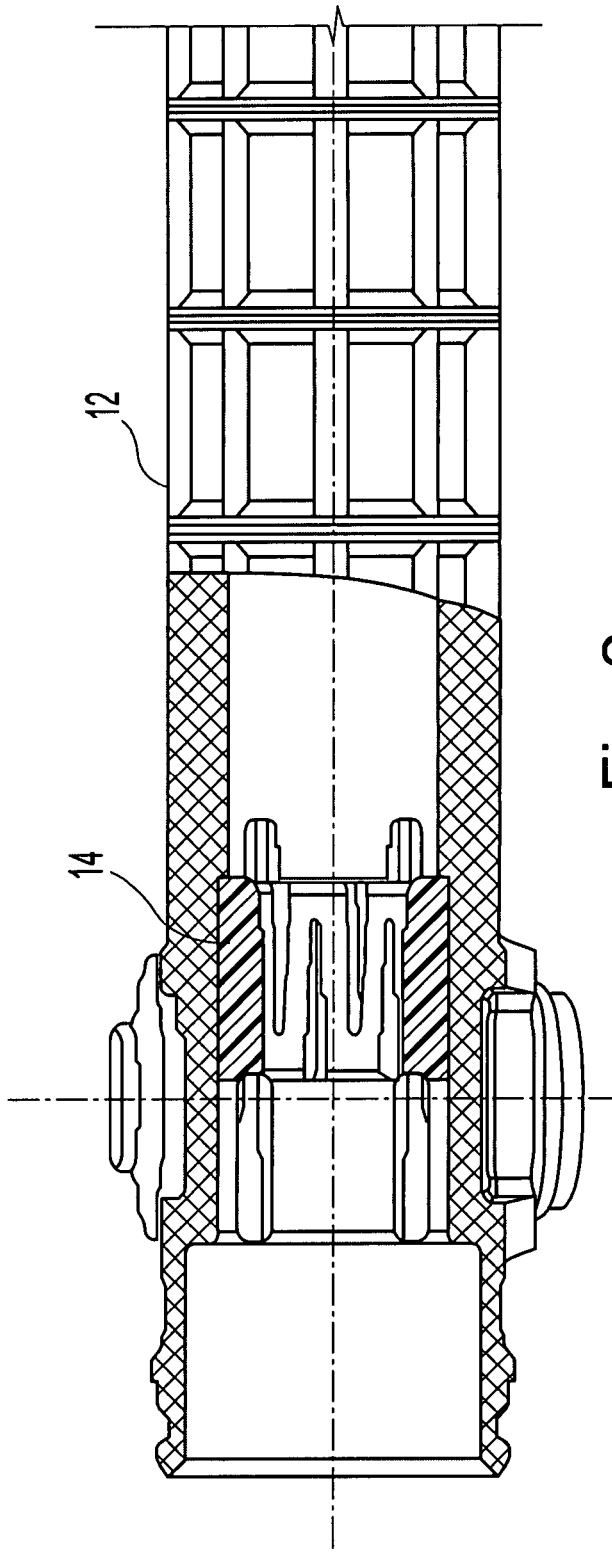
FIG. 2 is an enlarged view of the prior art assembly of FIG. 1.
Figure 3:
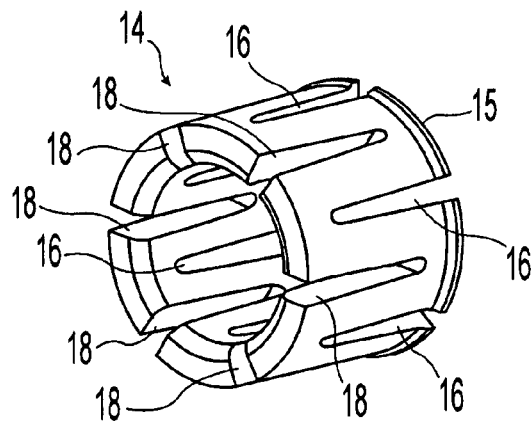
FIG. 3 is a perspective view of the bushing used in the prior art assembly of FIG. 1.
Figure 4:
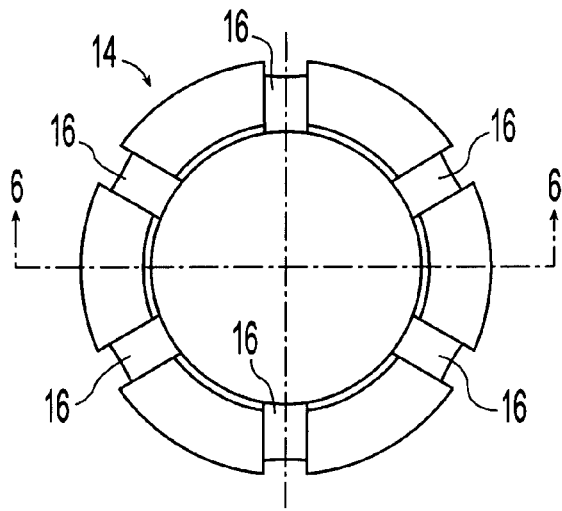
FIG. 4 is an end view of the prior art bushing of FIG. 3.
Figure 5:
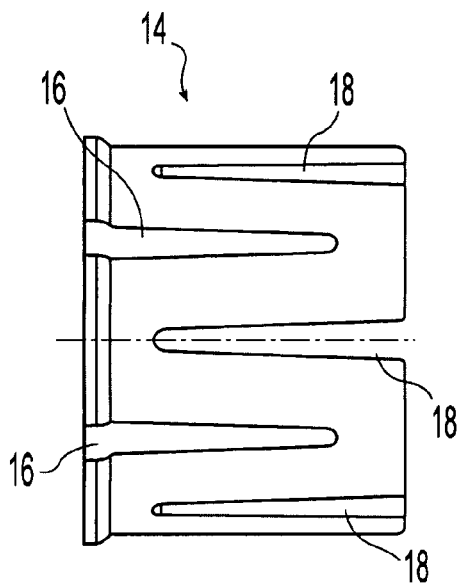
FIG. 5 is a side view of the prior art bushing of FIG. 3.
Figure 6:
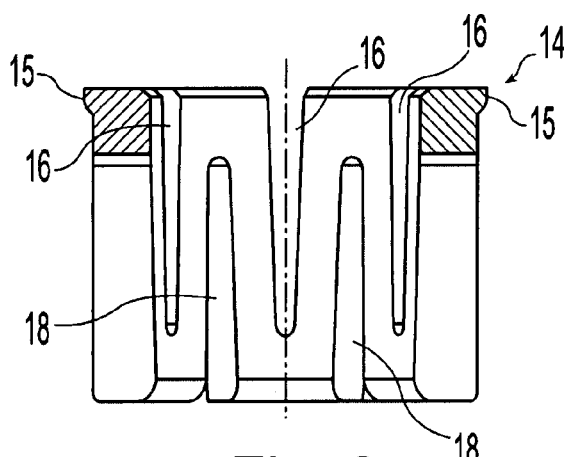
FIG. 6 is a cross sectional view of the prior art bushing of FIG. 3 taken along line 6-6 of FIG. 4.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 7:
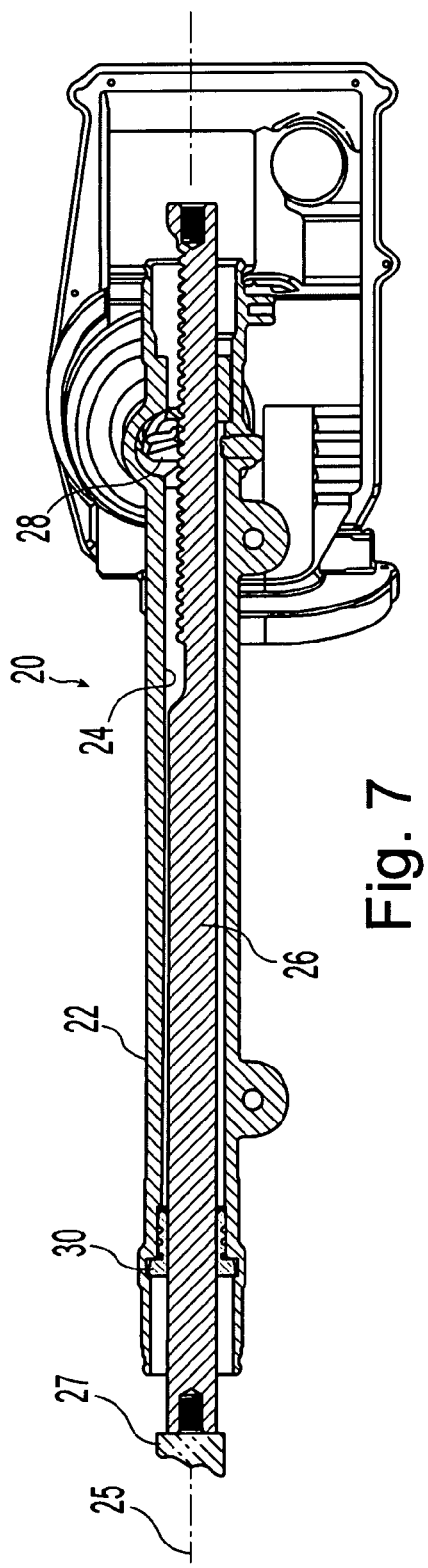
FIG. 7 is a sectional view of a rack and pinion steering gear assembly in accordance with the present invention.

A rack and pinion steering gear assembly 20 in accordance with the present invention is shown in FIG. 7. Rack and pinion assembly 20 may take various forms, including but not limited to those for non-assisted standard manual steering systems, column assist and pinion assist electric power steering systems, and hydraulic assist power steering systems.

Illustrated steering gear assembly 20 includes a housing 22 defining an internal bore 24, a rack 26 and a pinion gear 28. The use of a housing 22, rack 26 and pinion gear 28 in a steering gear assembly is well known to those having ordinary skill in the art and examples of such steering gear assembly components that can be modified for use with the present invention are disclosed in U.S. Pat. Nos. 6,454,044 B1 and 6,637,540 B2 both of which are expressly incorporated herein by reference.

As can be seen in FIG. 7, rack 26 is disposed within housing bore 24 and is engaged by pinion gear 28. As is well known in the art, rotation of the vehicle steering wheel (not shown) by the driver results in the rotation of pinion gear 28 which thereby results in the linear translation of rack 26 relative to housing 22 within bore 24 along axis 25. As is also well-known in the art, tie rod assemblies 27 are secured to opposite ends of rack 26 to thereby couple rack 26 with steerable wheels (not shown) of the vehicle.

Figure 9:
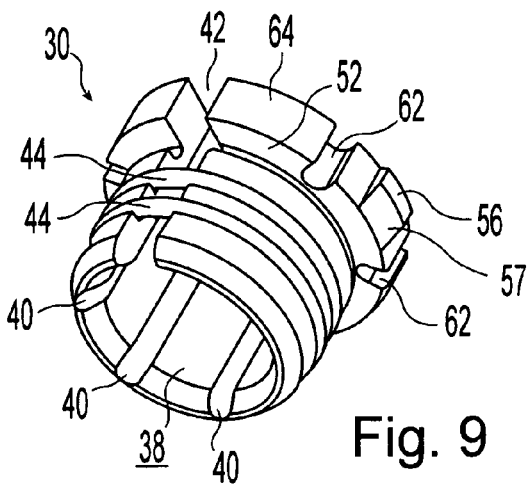
FIG. 9 is a perspective view of the bushing in the assembly of FIG. 7.
Figure 10:
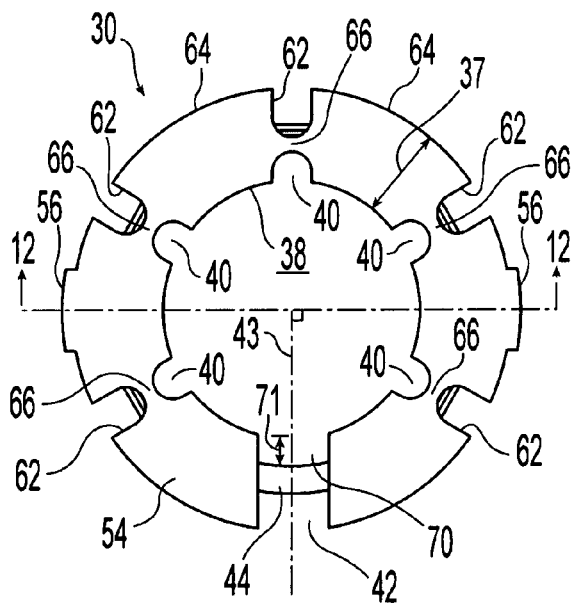
FIG. 10 is an end view of the bushing of FIG. 9.
Figure 11:
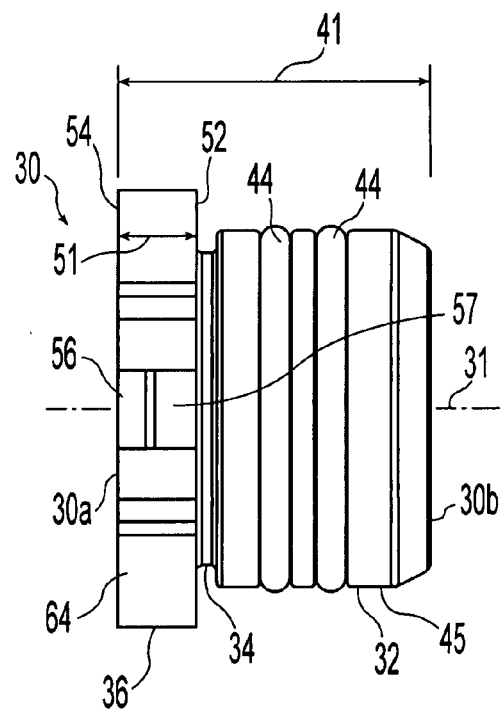
FIG. 11 is a side view of the bushing of FIG. 9.
Figure 12:
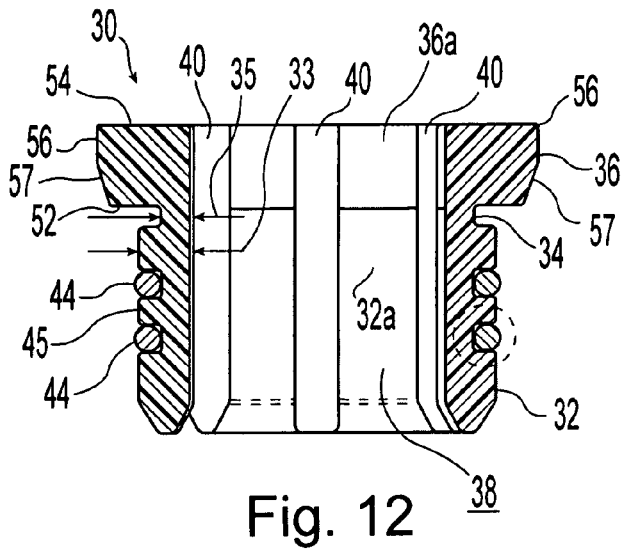
FIG. 12 is a sectional view taken along line 12-12 of FIG. 10.

The illustrated steering gear assembly 20 also includes a rack bushing 30 which is shown in detail in FIGS. 9-13. Bushing 30 defines a central bushing axis 31 that is substantially co-linear with axis 25 when busing 30 is in its assembled position operably disposed between rack 26 and housing 22. As best seen in FIGS. 11 and 12, bushing 30 has three main longitudinal portions, a tubular portion 32, an intermediate portion 34 and a flange portion 36. The radial inwardly facing surface 38 of bushing 30 has a substantially cylindrical shape and includes a number of axially extending recesses 40 that form discontinuities in the generally cylindrical shape of inner surface 38. There are five such recesses 40 in the illustrated embodiment.

As best seen in FIGS. 9 and 10, bushing 30 has a substantially C-shaped cross section and defines a gap 42 that extends the axial length 41 of bushing 30. In the illustrated embodiment, gap 42 extends substantially parallel to axis 31 of bushing 30 and axially extending recesses 40 and gap 42 are spaced apart at substantially equidistant circumferential distances.

A radially compressible member 44 taking the form of an O-ring is disposed on the tubular portion 32 of bushing 30. Although a single compressible member 44 may be utilized with the present invention, the illustrated embodiment employs two O-rings 44 for reasons which are discussed in greater detail below. When assembled, O-rings 44 are disposed between bushing 30 and housing 22 and fully encircle bushing 30 extending across gap 42. O-rings 44 are seated in circumferentially extending grooves 46 on the radial outer surface 45 of tubular portion 32. As most easily seen in FIG. 13, O-rings 44 have a thickness that is greater than the depth of groove 46 such that O-rings 44 project radially outwardly of tubular portion 32 of bushing 30.

Figure 8:
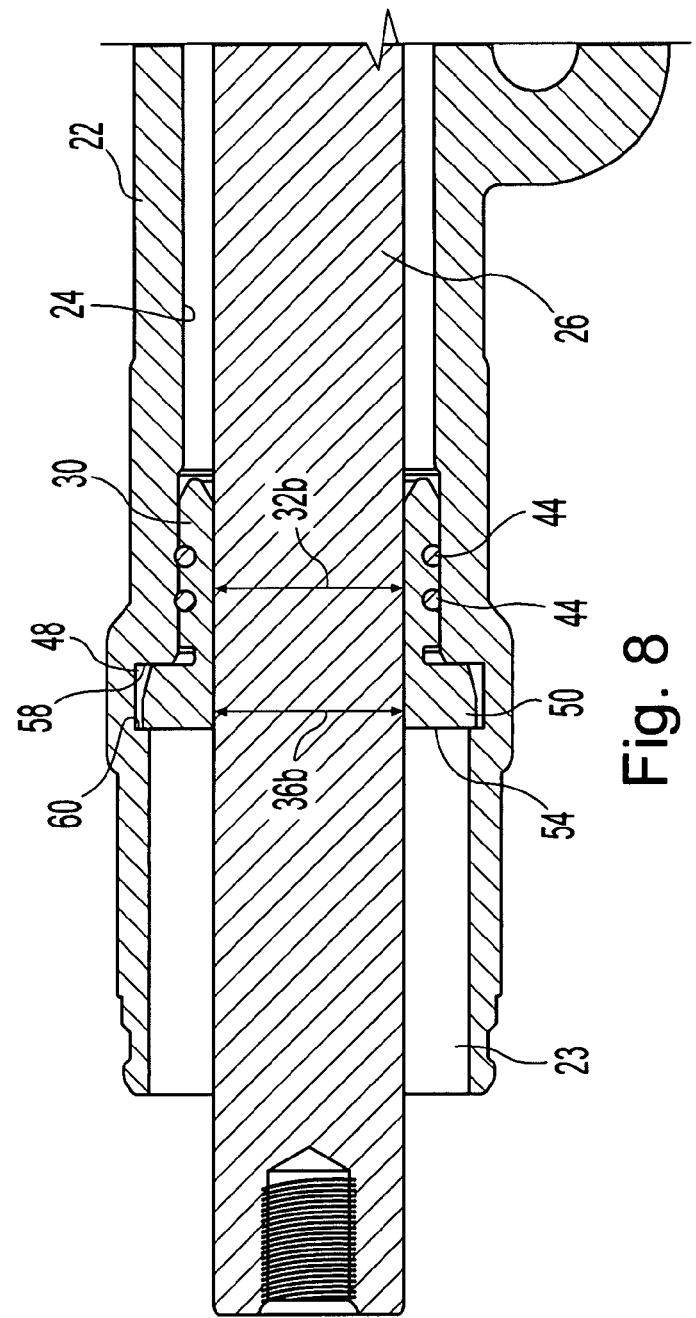
FIG. 8 is an enlarged view of a portion of FIG. 7.

Bushing 30 also includes a radially extending flange 50. Flange 50 includes a first surface 52 and an opposite second surface 54. Flange 50 also includes a pair of retention tabs 56 that are received in an annular recess 48 formed in housing bore 24. Located adjacent recess 48 is surface 58 which is disposed at an angle to axis 25 so that it can engage first surface 52 of flange 50 and thereby bearingly engage flange 50 and limit its axial movement. Surface 58 is disposed perpendicular to axis 25 in the illustrated embodiment. Sidewall 60 of recess 48 faces the opposite direction of surface 58 and when bushing 30 is installed in housing 22, sidewall 60 engages retention tabs 56, as best seen in FIG. 8, while surface 58 limits axial movement of bushing 30 in the opposite direction to thereby secure bushing 30 relative to housing 22.

Retention tabs 56 are disposed on flange 50 at diametrically opposite positions and extend radially outwardly from flange 50. As best seen in FIG. 10, gap 42 is located on radial line 43 extending from central axis 31 (which is collinear with axis 25 when bushing 30 is installed) that is disposed substantially perpendicular to the diametrically extending line (i.e., cross section line 12-12 in FIG. 10) intersecting tabs 56. This configuration of tabs 56 and gap 42 allows bushing 30 to be compressed to bend bushing 30 at recesses 40 to close or partially close gap 42 and thereby reduce the outermost diameter of bushing 30 defined by tabs 56 when installing bushing 30 within housing 22. The sloped walls 57 leading to retention tabs 56, best seen in FIGS. 9 and 12, may act as camming surfaces as walls 57 engage housing bore 24 and thereby bias bushing 30 radially inwardly and facilitate the closure of gap 42 as bushing 30 is being installed in housing 22. After bushing 30 has been installed within housing 22 with retention tabs 56 projecting into recess 48, rack 26 is inserted through bushing 30.

The use of flange 50 in combination with gap 42 provides bushing 30 with an "error-proofing" feature. In other words, for both bushing 30 and rack 26 to be installed within housing 20, bushing 30 must be properly positioned with flange 50 seated in recess 48. This is because the use of relatively large radially outwardly extending feature, e.g., either flange 50 or tabs 56, combined with gap 42 results in the substantial closure of gap 42 as bushing 30 is being installed within housing 20. In the illustrated embodiment, outer radial surface 64 of flange 50, sloped walls 57 and tabs 56 all may engage the inner surface of housing bore 24 reducing or closing gap 42 and thereby reducing the effective inner diameter of bushing 30 as bushing 30 is being installed. Prior to the seating of flange 50 and tabs 56 within recess 48, the radially inward compressing of bushing 30 reduces the inner diameter of bushing 30 to a sufficient degree that rack 26 cannot be inserted therethrough, it is only when flange 50 and tabs 56 are properly seated within recess 48 that rack 26 can be inserted through bushing 30 thereby "error-proofing" the installation of bushing 30. Furthermore, once rack 26 has been inserted through bushing 30, tabs 56 are trapped within recess 48 and bushing 30 can no longer be compressed radially inwardly to a sufficient degree to allow retention tabs 56 to be released from recess 48.

It is also noted that a plurality of axially extending recesses 62 are located on the outer radial surface 64 of flange 50. Recesses 62 are located opposite the plurality of inner recesses 40 so that only a thin web 66 of material separates recesses 62 and 40 in flange portion 36. This facilitates the bending of bushing 30 at the location of thin webs 66 to reduce gap 42 when installing bushing 30 within housing 22.

By placing tabs 56 on a diametrical line perpendicular to the radial line intersecting gap 42 enhances the inward displacement of tabs 56 when gap 42 is reduced. When bushing 30 is positioned so that retention tabs 56 are aligned with recess 48, the inherent resiliency of bushing 30 will cause gap 42 to re-expand with retention tabs 56 being biased into seated engagement with recess 48 to thereby secure bushing 30 relative to housing 22. Although the disclosed recess 48 has an annular shape, other interfittingly shaped recesses and retention tabs may also be employed. Although having retention tabs that are an integral part of bushing 30 reduces the overall number of parts, those having ordinary skill in the art will readily appreciate that other means, e.g., a snap ring, can also be used to secure the bushing within the housing in alternative embodiments of the invention.

Figure 13:
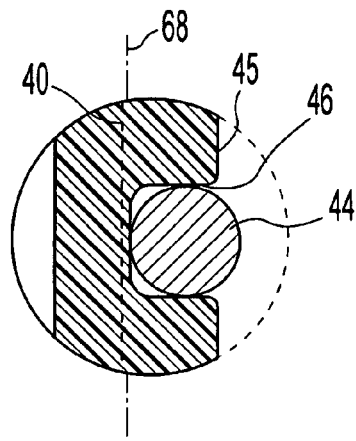
FIG. 13 is an enlarged view of a portion of FIG. 12.

With regard to the configuration of the various recesses and grooves formed in bushing 30, it is further noted that grooves 46, in which O-rings 44 are seated, extend radially inwardly and recesses 40 extend radially outwardly to substantially equivalent radial distances, corresponding to line 68 in FIG. 13, from axis 31. Consequently, there is only a thin layer of material or no separating material at all where grooves 46 and recesses 40 intersect. In the illustrated embodiment, there remains a small layer of material separating recesses 40 from grooves 46.

Second surface 54 of flange 50 of the illustrated embodiment acts as a stop surface and is engageable with a structure coupled with rack 26. In the illustrated assembly 20, the structure 27 engaged by stop surface 54 is a portion of the tie rod assembly that enters enlarged diameter portion 23 of housing bore 22 to engage stop surface 54. In alternative embodiments, however, the coupled structure could be a part of rack 26 or other intervening structure disposed between rack 26 and the steerable wheels of the vehicle that engages stop surface 54 to thereby limit the axial travel of rack 26. The use of a relatively axially thick flange 50 provides flange portion 36 with the strength to resist the relatively high shear and compressive loads that will be imposed on flange 50 due to its use as a stop surface. The use of such a large flange, however, can have a negative impact on the manufacturing process, e.g., it can be difficult to provide dimensional control when injection molding relatively thick acetal parts. As discussed in greater detail below, however, the illustrated bushing 30 has been configured to minimize such negative impacts.

When rack and pinion steering gear 20 is fully assembled, gap 42 provides a venting passage 70 between opposite axial ends 30a, 30b of bushing 30. In this regard it is noted that in the fully assembled condition, there will remain a distance 71 (FIG. 10) between interior of O-ring 44 and rack 26 (not shown in FIG. 10). This open space 70 between O-ring 44 and rack 26 at gap 42 together with each of the open axially extending spaces defined by recesses 40 will provide venting passages between opposite axial ends 30a, 30b of bushing 30. The use of such recesses and gaps in bushing 30 provides manufacturing efficiencies in comparison to the provision of venting passages in housing 30.

The differing embodiments of bushing 30 may also possibly provide one or more other manufacturing efficiencies. For example, the illustrated bushing 30 is configured to facilitate its efficient manufacture by the injection molding of an acetal material. Acetal is a material that provides a good bearing surface when used as a bushing, however, the molding of acetal parts can present manufacturing difficulties. Such difficulties tend to increase as the thickness of the molded acetal part is increased with thicker components being subject to an increased likelihood of dimensional variance or distortion.

It is first noted that the thickest portion of bushing 30 is flange 50 and, thus, it will be most difficult to control the dimensions of flange 50 when forming bushing 30 by injection molding an acetal material. The illustrated bushing 30 has been configured to minimize the impact of any such dimensional variances in flange 50. First, it is noted that radially inward facing surface 38 has a first substantially cylindrical portion 32a in the tubular portion having a first diameter 32b and has a second substantially cylindrical portion 36a in the flange portion 36 having a second diameter 36b. The second diameter 36b located in flange portion 36 is larger than the first diameter 32b whereby the inwardly facing surface 38 in the flange portion 36 (cylindrical portion 36a) is spaced from rack 26 while the first substantially cylindrical portion 32a is in bearing engagement with rack 26. This allows for greater dimensional tolerances in flange portion 50. In the illustrated embodiment, the relief used to form second cylindrical portion 36a is approximately 0.1 mm, in other words, diameter 36b is approximately 0.2 mm larger than diameter 32b.

The illustrated bushing 30 also includes an intermediate portion 34 that axially separates tubular portion 32 and flange portion 36. The radial thickness 35 of intermediate portion 34 is less than the radial thickness 33 of tubular portion 32 and is also less than the radial thickness 37 of flange portion 36. As mentioned above, the relatively large radial thickness 37 and axial thickness 51 of flange 50 makes it more difficult to control the dimensions of flange 50 than the thinner tubular portion 32. By separating tubular portion 32 from flange portion 36 with relatively thin intermediate portion 34, tubular portion 32 is less likely to be negatively impacted by any dimensional variances that occur in flange portion 36. In the illustrated embodiment, radial thickness 35 of intermediate portion 34 is approximately 3 mm. It is further noted that recesses 40 and other features in bushing 30 create discontinuities such that there is no uniform radial thickness in each of the different sections of bushing 30. As used herein, the comparison of relative radial thicknesses between tubular portion 32, intermediate portion 34 and flange portion 36 is a comparison of the radial thickness of each such portion at the greatest radial thickness of that portion except for features having only a relatively minor circumferential length, e.g., tabs 56 in flange portion 36 which extend for a circumferential length that is no greater than the approximate radial thickness of flange 50.

With further regard to flange 50, it is noted that axial thickness 51 of flange 50, i.e., the distance between surfaces 52, 54 is at least about 7.5 mm and, in the illustrated embodiment, axial thickness 51 is approximately 7.6 mm. Providing such a relatively axially thick flange facilitates the operation of surface 54 as a stop surface. While housing surface 58 could be employed as a stop surface, the use of a relatively thick resinous layer of material, e.g., flange 50, to define stop surface 54 reduces the noise that is generated upon contact between structure 27 and stop surface 54 in comparison to the use of a metallic stop surface.

O-rings 44 also facilitate the use of relatively large tolerances in the manufacture of bushing 30 and thereby facilitate the manufacture of bushing 30 by the injection molding of an acetal material. As best seen in FIGS. 12 and 13, O-rings 44 and grooves 46 are sized so that O-rings 44 project radially outwardly from grooves 46 beyond outer radial surface 45 of tubular portion 32. This allows tubular portion 32 to be molded to have an outer diameter that is approximately 0.4 mm smaller than the inner diameter of housing bore 24 at the location where tubular portion 32 is installed within housing 22. Consequently, there is a gap of approximately 0.2 mm between outer radial surface 45 of tubular portion 32 and housing bore 24 and this gap may vary from approximately 0.1 mm to approximately 0.3 mm due to manufacturing tolerances. By dimensioning grooves 46 and O-rings 44 such that O-rings 44 project radially outwardly of outer radial surface 45 by more than 0.3 mm, O-rings 45 will be compressed between bushing 30 and housing 22 as bushing is installed and will thereby bias inward facing surface 32a of bushing 30 into bearing contact with rack 26. In the illustrated embodiment, O-rings 44 are conventional nitrile O-rings. Although specific dimensions and materials have been disclosed with regard to O-rings 44 and the component parts it engages, those having ordinary skill in the art will recognize that other suitable materials and dimensions may also be employed with the present invention.

This arrangement with O-rings 44 being compressed between bushing 30 and housing 22 provides a "delash" function and allows bushing 30 to be installed between rack 26 and housing 22 without any clearance between adjacent parts in the space between rack 26 and housing 22. The use of compressible members such as O-rings 44 also allows bushing 30 to be manufactured to looser tolerances than might otherwise be required to delash rack 26 and housing 22. It is further noted that while bushing 30 combines the use of compressible members 44 with a flange 50 that also functions as a travel stop, alternative embodiments of the present invention may provide for the use of a compressible member 44 without a flange 50 or the use of an integral stop flange 50 with intermediate and tubular portions 34, 32 that do not include compressible O-rings. When a flange 50 is employed, the use of recesses 62 on the radial exterior surface of the flange that are arranged opposite interior recesses 40 facilitates the radial compression and flexibility of the resulting bushing.

The radially inward compressive forces exerted on bushing 30 by O-rings 44 bias bushing surface 32a into bearing contact with rack 26. This inward biasing of bushing 30 is facilitated by the presence of recesses 40 and gap 42 which enhance the flexibility of bushing 30 and allow it to more easily conform to the shape of rack 26. The presence of recesses 40 and gap 42 define axially extending channels along rack 26 where there is no direct contact between bushing 30 and rack 26. The circumferential extent of contact between bushing 30 and rack 26, however, remains relatively high and this sizable area of contact inhibits the excessive wear of bushing 30 which can arise from an arrangement where there is only a minimal area of contact.

One drawback to providing fully encircling contact between the bushing and the rack is that such contact can "wipe" lubrication from the rack. The use of recesses 40 and gap 42 which are arranged parallel to axes 31, 25 provide circumferentially spaced areas on rack 26 where lubrication is not wiped from rack 26 as rack 26 is linearly reciprocated within housing 22. These channels where there is no direct contact between bushing 30 and rack 26 also reduces the friction between bushing 30 and rack 26 thereby reducing the insertion forces required during assembly of steering gear 20. In the illustrated embodiment, bushing 30 may be installed manually without the use of specialized tools, thereby facilitating the efficient assembly of steering gear 20. Thus, there are number of competing design criteria, some of which are enhanced by increasing the area of contact between bushing 30 and rack 26 while others are degraded by increasing the area of contact. Although various acceptable solutions within the scope of the invention may be reached to satisfy these competing design criteria, the use of five recesses 40 together with a single gap 42 to provide six equally circumferentially spaced channels about rack 26 is thought to provide an acceptable balance between the competing design criteria.

As those having ordinary skill in the art will recognize, the use of a gap 42 that extends from one axial end 30a to the other axial end 30b of bushing 30 will result in a bushing that does not have any hoop strength and wherein the size of the resulting gap 42 can adjust in size so that bushing 30 conforms to the outer radial surface of bushing 26 as described above. This is aspect of bushing 30 allows it to avoid two potential drawbacks that can arise with rack bushings that do not have such a fully axially extending gap. In such bushings, if the inner diameter of the bushing is larger than the outer diameter of the rack, the bushing will typically not fully conform to the outer surface of the rack leaving an undesirable clearance between the rack and the bushing. On the other hand, when the inner diameter of the bushing is slightly undersized relative to the rack, the rack may be forced through the bushing generating hoop stresses in the bushing and radially inwardly directed compressive forces against the rack thereby increasing the frictional resistance between the rack and bushing when the rack moves relative to the bushing.

It is further noted that while the illustrated embodiment utilizes two O-rings 44, alternative embodiments could employ a single O-ring or other single suitable compressible member to provide a delashing function. One consequence of utilizing a single O-ring 44 is that it provides a single line of contact with housing 22. This could, potentially, lead to the bushing tilting back and forth about this single line of contact between two different positions in a manner not unlike that of a teeter-totter. If such tilting action were to occur, the repositioning of the bushing each time it tilted between positions would cause an undesirable noise. The use of two spaced apart O-rings 44, as exemplified in the illustrated embodiment 20, provides two spaced apart lines of contact with interior bore 24 of housing 22 and thereby inhibits the tilting movement of bushing 30.

It is also noted that although the disclosed embodiment 30 has been described as an acetal bushing, other suitable materials may alternatively be employed to manufacture bushing 30. Furthermore, while the illustrated bushing 30 does not include a Teflon coating, alternative embodiments of bushing 30 could take the form of an injection molded acetal material with a Teflon coating.

While this invention has been described as having an exemplary design, the present invention may be further modified within the spirit and scope of this disclosure. This application is therefore intended to cover any variations, uses, or adaptations of the invention using its general principles.

What is claimed is:

1. A rack and pinion steering gear assembly comprising:
a housing;
a rack disposed at least partially within said housing, said rack being translatably moveable relative to said housing along an axis;
a bushing operably disposed between said rack and said housing, said bushing having an axial length and defining a gap; said gap extending the entire axial length of said bushing; and
at least one compressible member disposed between said bushing and said housing, said compressible member extending across said gap and fully encircling said bushing wherein said bushing comprises a substantially tubular portion and a flange portion, said at least one compressible member being disposed on said tubular portion, said flange portion including a radially extending flange, said flange having first and second opposing surfaces, said first surface bearingly engaging a surface of said housing disposed at an angle to said axis, said tubular portion and said flange portion being axially separated by an intermediate portion, said intermediate portion having a radial thickness less than a radial thickness of said tubular portion and less than a radial thickness of said flange portion and wherein a radially inwardly facing surface of said bushing defines a first substantially cylindrical portion in said tubular portion having a first diameter and a second substantially cylindrical portion in said flange portion having a second diameter, said second diameter being larger than said first diameter whereby said inwardly facing surface in said flange portion is spaced from said rack; further comprising a pair of retention tabs disposed substantially diametrically oppositely on said flange and extending radially outwardly from said flange, said retention tabs being engageable with a recess in said housing to thereby secure said bushing relative to said housing, said gap extending substantially parallel with said axis and a radial line extending from said axis to said gap being disposed substantially perpendicular with a diametrical line joining said oppositely disposed tabs.

2. The steering gear assembly of claim 1 wherein said at least one compressible member comprises at least two O-ring members, each of said O-ring members extending across said gap and fully encircling said bushing.

3. The steering gear assembly of claim 1 wherein said gap extends substantially parallel to said axis.

4. The steering gear assembly of claim 3 wherein said bushing defines a radially inwardly facing surface having a substantially cylindrical shape and includes a plurality of axially extending recesses forming discontinuities in said cylindrical shape.

5. The steering gear assembly of claim 4 wherein said plurality of axially extending recesses and said gap are spaced apart at substantially equidistant circumferential distances.

6. The steering gear assembly of claim 1 wherein said bushing further comprises a radially extending flange, said flange having first and second opposing surfaces, said first surface bearingly engaging a surface of said housing disposed at an angle to said axis and said second surface providing a stop surface for engaging a structure coupled with said rack and thereby limiting axial travel of said rack.

7. The steering gear assembly of claim 6 further comprising a pair of retention tabs disposed substantially diametrically oppositely on said flange and extending radially outwardly from said flange, said retention tabs being engageable with a recess in said housing to thereby secure said bushing relative to said housing.

8. The steering gear assembly of claim 1 wherein said bushing comprises an acetal material and wherein said intermediate portion has a radial thickness of no more than approximately 3 mm and said flange has an axial thickness of at least about 7.5 mm.

9. The steering gear assembly of claim 1 wherein said second surface of said flange provides a stop surface for engaging a structure coupled with said rack and thereby limits axial travel of said rack.

10. The steering gear assembly of claim 1 wherein said radially inwardly facing surface includes a first plurality of axially extending recesses forming discontinuities in said cylindrical shape and wherein said first plurality of axially extending recesses and said gap are spaced apart at substantially equidistant circumferential distances.

11. The steering gear assembly of claim 10 wherein said flange comprises a second plurality of axially extending recesses on an outer radial surface of said flange, said second plurality of recesses being disposed opposite said first plurality of recesses.

12. The steering gear assembly of claim 11 further comprising at least one circumferentially extending groove on an outer radial surface of said tubular portion, said at least one compressible member being seated in said circumferentially extending groove and wherein said at least one circumferentially extending groove extends radially inwardly and said first plurality of recesses extend radially outwardly to substantially equivalent radial distances from said axis.

13. The steering gear assembly of claim 1 wherein said housing defines an annular recess and said flange is seated in said annular recess, said rack being installable in said housing through said bushing only when said flange is seated in said annular recess.

14. A rack and pinion steering gear assembly comprising:
a housing;
a rack disposed at least partially within said housing, said rack being translatably moveable relative to said housing along an axis;
a bushing consisting essentially of an acetal material, said bushing being operably disposed between said rack and said housing, said bushing having an axial length and defining a gap; said gap extending the entire axial length of said bushing; and
wherein said bushing comprises a substantially tubular portion and a flange portion, said flange portion including a radially extending flange, said flange having first and second opposing surfaces, said first surface bearingly engaging a surface of said housing disposed at an angle to said axis, said tubular portion and said flange portion being axially separated by an intermediate portion, said intermediate portion having a radial thickness less than said tubular portion and less than said flange portion and wherein a radially inwardly facing surface of said bushing defines a first substantially cylindrical portion in said tubular portion having a first diameter and a second substantially cylindrical portion in said flange portion having a second diameter, said second diameter being larger than said first diameter whereby said inwardly facing surface in said flange portion is spaced from said rack; further comprising a pair of retention tabs disposed substantially diametrically oppositely on said flange and extending radially outwardly from said flange, said retention tabs being engageable with a recess in said housing to thereby secure said bushing relative to said housing, said gap extending substantially parallel with said axis and a radial line extending from said axis to said gap being disposed substantially perpendicular with a diametrical line joining said oppositely disposed tabs.

15. The steering gear assembly of claim 14 wherein said radially inwardly facing surface includes a first plurality of axially extending recesses forming discontinuities in said cylindrical portions and wherein said first plurality of axially extending recesses and said gap are spaced apart at substantially equidistant circumferential distances.

16. The steering gear assembly of claim 15 wherein said flange comprises a second plurality of axially extending recesses on an outer radial surface of said flange, said second plurality of recesses being disposed opposite said first plurality of recesses.

17. The steering gear assembly of claim 16 wherein said intermediate portion has a first radial thickness of no more than approximately 3 mm and wherein said flange has an axial thickness of at least about 7.5 mm and said second surface of said flange provides a stop surface for engaging a structure coupled with said rack and thereby limits axial travel of said rack.

18. The steering gear assembly of claim 14 wherein said housing defines an annular recess and said flange is seated in said annular recess, said rack being installable in said housing through said bushing only when said flange is seated in said annular recess.

\* \* \* \* \*